(12) United States Patent  
de Jong

(10) Patent No.: US 7,052,228 B2  
(45) Date of Patent: May 30, 2006

(54) DEVICE FOR STACKING EMPTY TRANSPORT PALLETS OR REMOVING SAME FROM A STACK

(75) Inventor: Leen-Pieter de Jong, Varsseveld (NL)

(73) Assignee: Nedcon Magazijninrichtung BV, Doetinchem (NL)

(*) Notice: Subject to any disclaimer, the term of this patent is extended or adjusted under 35 U.S.C. 154(b) by 146 days.

(21) Appl. No.: 10/118,268

(22) Filed: Apr. 8, 2002

(65) Prior Publication Data

US 2003/0059290 A1    Mar. 27, 2003

(30) Foreign Application Priority Data

Sep. 27, 2001   (DE) ................. 201 15 948

(51) Int. Cl.
*B65G 57/28*   (2006.01)
*B65H 15/00*   (2006.01)

(52) U.S. Cl. .............. 414/789.2; 414/778; 414/782

(58) Field of Classification Search .......... 211/49.1; 248/133, 139, 140–143, 371; 414/778, 789.2, 414/789.3, 788, 782

See application file for complete search history.

(56) References Cited

U.S. PATENT DOCUMENTS

| 1,977,497 | A |  | 10/1934 | Springer |
| 2,096,958 | A |  | 10/1937 | Clerc |
| 3,411,639 | A |  | 11/1968 | Dryon |
| 3,974,921 | A |  | 8/1976 | Tokuno ................ 214/7 |
| 4,019,639 | A |  | 4/1977 | Stobb |
| 4,084,713 | A |  | 4/1978 | Rohrs et al. |
| 4,293,264 | A | * | 10/1981 | Gilts et al. ............. 211/50 |
| 5,037,047 | A | * | 8/1991 | Chanko ............... 248/140 |
| 5,681,141 | A | * | 10/1997 | Critel ............... 414/789.2 |
| 5,950,771 | A |  | 9/1999 | Ferrisi et al. ........... 187/411 |
| 6,027,298 | A | * | 2/2000 | Crowley ............. 414/398 |
| 6,050,771 | A |  | 4/2000 | Dykstra ............. 414/795.8 |
| 6,203,262 | B1 |  | 3/2001 | Frich et al. .......... 414/331.01 |
| 2002/0085902 | A1 |  | 7/2002 | Worrel et al. ........... 414/276 |

FOREIGN PATENT DOCUMENTS

| DE | 11 16 599 | 11/1961 |
| DE | 33 08 481 | 9/1984 |
| EP | 1 000 886 | 5/2000 |
| EP | 1 211 198 | 6/2002 |

* cited by examiner

*Primary Examiner*—Douglas Hess  
(74) *Attorney, Agent, or Firm*—Gudrun E. Huckett

(57) ABSTRACT

A device for stacking empty transport pallets and removing empty transport pallets from a stack has a pallet receptacle with a first leg and a second leg positioned at a right angle to the first leg. The pallet receptacle is configured to receive a pallet stack of pallets, wherein the pallets are supported with a narrow side on the first leg while the lowermost pallet of the pallet stack rests flat on the second leg. A pivoting device is provided to pivot the pallet receptacle between a first end position, in which the first leg extends at a slant to the horizontal, and a second end position, in which the first leg extends substantially vertically.

3 Claims, 2 Drawing Sheets

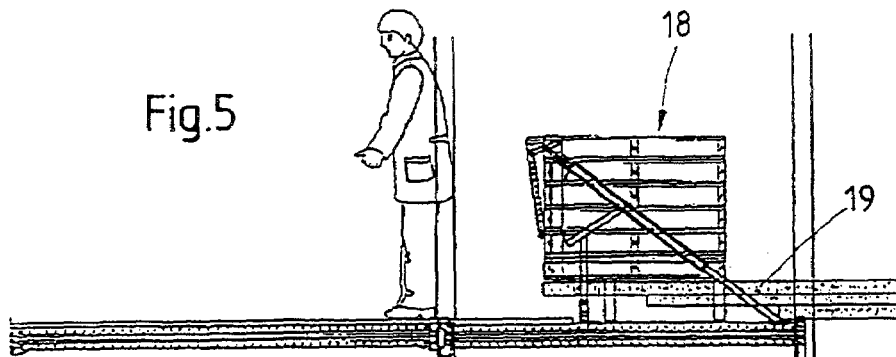
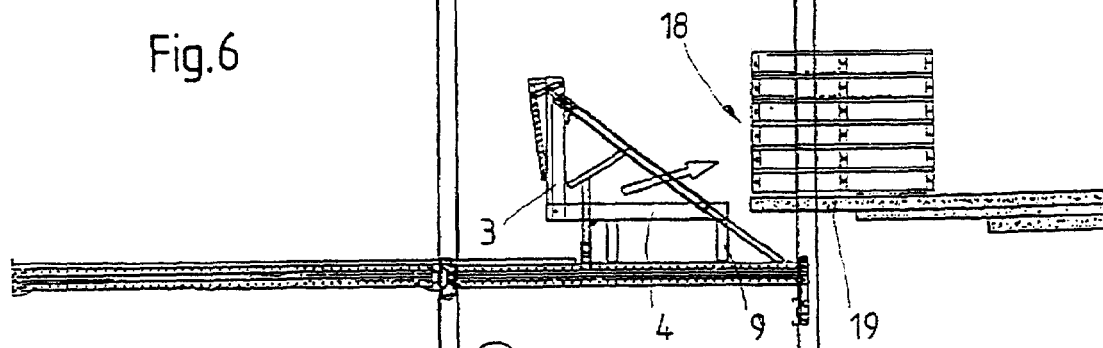
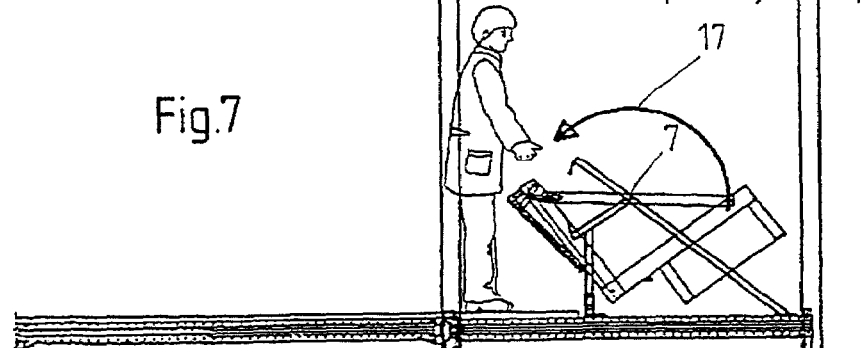
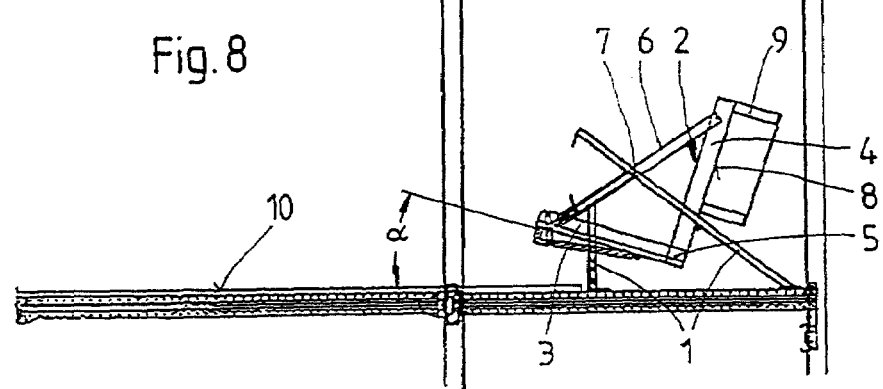

DEVICE FOR STACKING EMPTY TRANSPORT PALLETS OR REMOVING SAME FROM A STACK

BACKGROUND OF THE INVENTION

1. Field of the Invention

The invention relates to a device for stacking empty transport pallets, for example, standard Euro pallets, or removing them from a stack.

2. Description of the Related Art

In the storage and commissioning technology, pallets are often used as storing aids. Especially common are, for example, the standard Euro pallets. After removing the pallets, for example, in a commissioning operation, the empty pallets are stacked to form pallet stacks and are then transported by transport devices or transport vehicles to collection points.

The removal of the individual empty pallets, for example, from a commissioning shelf, as well as their collection to pallet stacks is usually performed by hand. This is heavy physical labor for the respective workman because the pallets often have a considerable weight and because it is necessary for forming the pallet stack to first lift the respective pallet with its entire weight to the level of the already formed stack and to then place it onto the stack. This is especially taxing on the back muscles of the workman performing this task. Moreover, the situation is further aggravated in that not only a simple placement in the sense of stacking of the empty pallets is required but also an alignment of the pallets of the pallet stack with regard to at least one common narrow side. By this alignment, which makes the described work even more difficult, the transport of the formed pallet stack on the conveying and transporting devices downstream is made more reliable.

SUMMARY OF THE INVENTION

It is an object of the present invention to provide a device with which the empty transport pallets can be stacked to a pallet stack suitable for further transport in a way that reduces the amount of force and energy exerted by the workman.

In accordance with the present invention, this is achieved in that a device of the aforementioned kind is provided with a pallet receptacle, comprised of a first leg and a second leg positioned at a right angle to the first leg, for receiving the pallet stack whose pallets are supported with one of their narrow sides on the first leg while the lowermost pallet rests flat on the second leg, and is further provided with a pivot device for pivoting the pallet receptacle between a first end position, in which the first leg extends at a minimal slant to the horizontal, and a second end position, in which the first leg extends substantially vertically.

A device with such a type of pallet receptacle can be loaded in an especially energy-saving way with individual pallets in the context of stacking empty pallets. For this purpose, in a first process step the individual pallets are initially positioned such that they are still supported with one edge on the floor and with the other edge on the first leg of the pallet receptacle. Subsequently, the pallet is gripped by the edge which is resting on the floor, is lifted, and at the same time moved by a pivot movement into the pallet receptacle. This movement pivots the pallet about its other edge which is already supported on the first leg. As a result of this pivot movement, the workman must not lift the entire weight of the respective pallet but only approximately one half of its weight. Moreover, an alignment of the pallet is not required because it is supported with its one edge already on the first leg of the pallet receptacle and is therefore already in a precisely defined position that is exactly aligned with the other pallets. At the end of the loading step, the pallet, positioned slightly slanted, lies down on the second leg of the pallet receptacle, or when there is already a first pallet present, against this first and thus lowermost pallet.

As soon is in the described way the pallet receptacle is loaded with the highest possible number of pallets to be placed thereon, in a further process step the entire pallet receptacle is pivoted into another end position. While in the first end position the first leg is positioned at a minimal slant relative to the horizontal, the first leg in the second end position is substantially vertically positioned. In the second end position the pallets of the pallet stack are therefore horizontally aligned and in this position the entire pallet stack can be received by a suitable pallet transporting device for the purpose of further transport, and this step completes the process. In a reverse sequence, pallets which are delivered in pallet stacks can also be removed from the pallet stack by means of the device in order to then load them with goods.

Since the first leg of the pallet receptacle extends at a minimal slant relative to the horizontal, the individual pallets immediately after their final placement are in a stable static position parallel to the second leg so that an accidental reverse tilting of the pallet is prevented.

For realizing the pivotability of the pallet receptacle, according to a preferred embodiment of the device according to the invention it is proposed that the pallet receptacle is pivotable about an axle which is arranged on a stationary frame and extends parallel to the first and second legs.

With the goal of an energy-saving activity for the operator of the device, it is furthermore suggested that the axle about which the pivot movement is carried out is in the vicinity of the centroidal axis of the pallet receptacle filled with a complete pallet stack. As a result of this arrangement of the axle, the filled pallet receptacle can be pivoted with a minimal force expenditure from one end position into the other end position. In reverse, returning the now empty pallet receptacle from the second end position into the first end position requires also only a minimal force expenditure.

In order to prevent an accidental pivoting of the pallet receptacle, according to a further embodiment it is suggested that the pallet receptacle in each of the two end positions can be locked. A corresponding locking element can be arranged on the pivotable pallet receptacle or the stationary frame.

For facilitating loading of the pallet receptacle, its first leg is preferably of an open configuration along the free edge facing away from the second leg. This facilitates the preliminary placement of the pallet which is still resting with its other edge on the floor.

According to a further embodiment, it is suggested that the pallet contact surface of the second leg is provided with at least one recess which extends from the free edge of the second leg in the direction toward the first leg and into which the loading fork of a pallet transporting device can be inserted. In this way, picking up the complete pallet stack is facilitated. It is not required to introduce the loading fork of the pallet transporting device into the relatively minimal horizontal gap between the lower and upperwood planks of the lowermost pallet. Moreover, in this configuration it is inconsequential in the case of pallets provided with differently designed longitudinal and transverse sides, as in the case of the Euro pallet, whether they rest longitudinally or transversely within the pallet receptacle because the bottom side of the lowermost pallet can be engaged in any case.

Further advantages and details will be explained in the following with the aid of the embodiment illustrated in the drawing showing the device according to the invention in different stages of the loading process.

BRIEF DESCRIPTION OF THE DRAWING

In the drawing:

FIG. 5 shows the loading fork engaging the pallet stack;

FIG. 6 shows the removal of the pallet stack from the pallet receptacle by means of the loading fork;

FIG. 7 illustrates the pallet receptacle being pivoted back into the first end position; and FIG. 8 shows the device according to the invention in the empty state with all device components illustrated.

DESCRIPTION OF THE PREFERRED EMBODIMENTS

Figure 1:
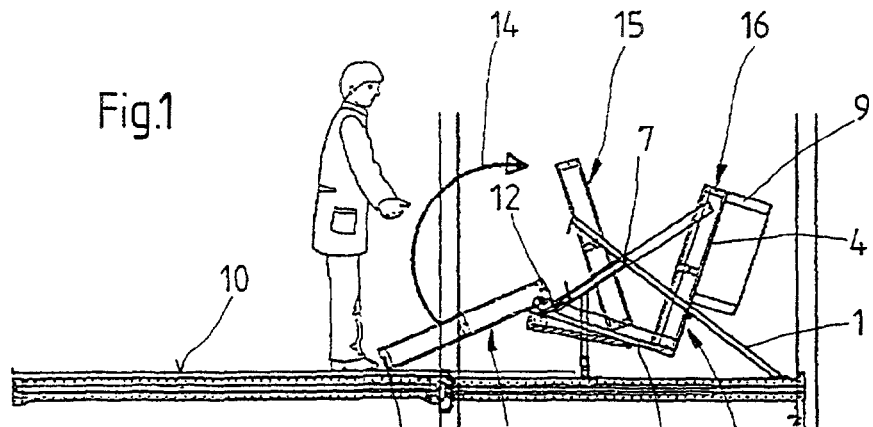
FIG. 1 shows a pallet receptacle in the first end position (pallet loading or pallet removal position), with one pallet already loaded into the pallet receptacle, one in an intermediate position, and the next pallet positioned on the floor and resting against the first leg, wherein the movement of the next pallet is illustrated by the curved arrow.

The device according to the invention and the process steps for using it will be explained first with the aid of FIG. 8 because FIG. 8 shows the device in the empty state, i.e., without pallets positioned therein. The device is comprised primarily of a stationary frame 1 and a pallet receptacle 2 pivotably arranged on the frame. The pallet receptacle 2 is comprised of a first leg 3 and a second leg 4 wherein the two legs 3, 4 are positioned at a right angle to one another. At the location 5 the legs 3, 4 are rigidly connected with one another. Moreover, the legs 3, 4 are also connected rigidly to one another by a transverse strut 6. An axle 7 is positioned on the transverse strut 6, approximately at its center. The pallet receptacle 2 is pivotably suspended in the frame 1 by means of the axle 7.

In FIG. 8, the pallet receptacle 2 is illustrated in its first end position. In this end position the first leg 3 has a minimal slant of a slant angle a relative to the horizontal. This slant angle $\alpha$ is preferably between 50° and 15°.

On the bottom side 8 of the second leg 4 a support leg 9 is arranged with which the pallet receptacle can be supported on the floor 10 in the second end position.

The device described by means of FIG. 8 functions in a way described in the following with the aid of FIGS. 1 through 7.

FIG. 1 shows the process step of loading the device with individual pallets, preferably with the relatively heavy Euro pallets. The pallet 11 is placed with its forward edge 12 onto the outer edge of the first leg 3 while the rear edge 13 of the pallet still rests on the floor 10. The pallet 11 can be moved into this position relatively easily and in an energy-saving way. Subsequently, the pallet 11 is lifted at its rearward edge 13 and moved corresponding to the pivot arrow 14 onto the pallet receptacle 2. When doing so, the pallet 11 pivots about its forward edge 12 which rests already on the first leg 3 of the pallet receptacle 2. The reference numeral 15 defines a statically undefined position that is assumed by the pallet before it reaches the final contact position on the second leg 4 or on a pallet 16 already positioned in the pallet receptacle. This first or lowermost pallet 16 is supported with its flat side on the second leg 4. The pallet which is illustrated in the intermediate position 15 then contacts areally the pallet 16, and the pallet 11, which according to FIG. 1 is the next one to be lifted momentarily, is then placed against the pallet 15, and so on. During this loading of the pallet receptacle 2 with the individual pallets the pallet receptacle is in its first end position.

Figure 2:
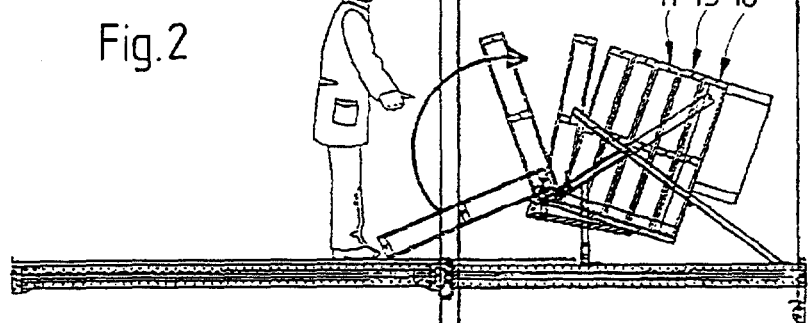
FIG. 2 shows several pallets loaded into the pallet receptacle, wherein the last pallet is shown in the initial position on the floor and in two intermediate positions on its path into the pallet receptacle.

FIG. 2 shows an advanced stage in which already almost all of the pallets to be loaded are positioned in the pallet receptacle 2.

Figure 3:
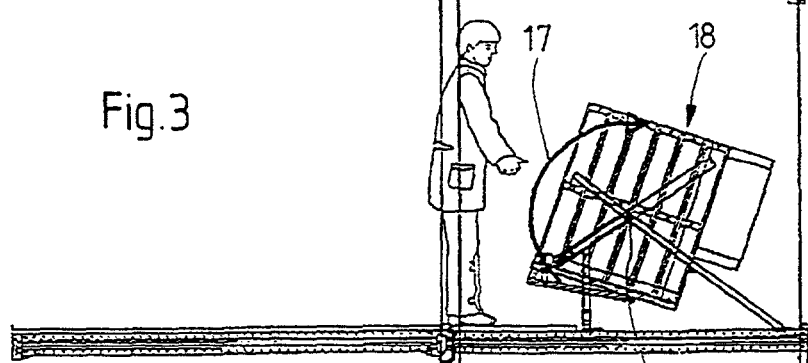
FIG. 3 illustrates completion of the pallet stack in the pallet receptacle.

In the process stage of FIG. 3, the pallet receptacle 2 is loaded with a complete stack of a total of six pallets. Once this has happened, the entire pallet receptacle 2, including the pallets positioned therein, is pivoted according to arrow 17 into the position illustrated in FIG. 4. When doing so, the pallet receptacle 2 performs a rotation about the axle 7 of a rotational angle between 75° and 85° and at the end of the rotation is now in its second end position. In this second end position, the first leg 3 extends vertically and the second leg 4 extends horizontally. The pallet receptacle 2 is supported on the floor 10 by means of the support leg 9.

Figure 4:
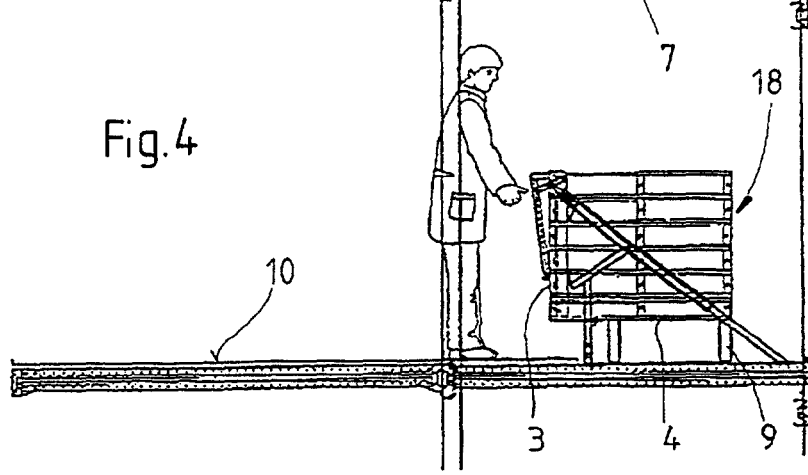
FIG. 4 shows the pallet receptacle pivoted into the second end position (stack removal or stack loading position)

Pivoting from the first end position according to FIG. 3 into the second end position according to FIG. 4 does not present a great physical problem for the workman because the axle 7 is arranged near the centroidal axis of the pallet receptacle 2 filled with a complete pallet stack 18.

Moreover, a locking device is present which locks the pallet receptacle 2 in the first end position as well as in the second end position and thus blocks movement thereof. The pallet receptacle 2 can be pivoted into the other position, respectively, only after a manual release of the locking device.

In FIGS. 5 and 6 two sequential stages are illustrated for demonstrating how the complete pallet stack 18 can be removed by using a pallet transporting device. The pallet transporting device is provided with a telescopically moveable loading fork 19 which can be moved into the second leg 4 of the pallet receptacle 2. In order to prevent a collision between the loading fork 19 and the second leg 4, the pallet contact surface of the second leg 4 is provided with two recesses which extend from the free edge of the second leg 4 in the direction toward the first leg 3. One of the loading forks 19, which are provided in pairs, can be horizontally moved into one of the recesses, respectively. When subsequently the loading fork 19 is lifted, the entire pallet stack 18 is picked up by the loading fork 19 and can be transported away horizontally, as illustrated in FIG. 6.

The pallet receptacle 2 is empty and can be manually pivoted back into the first end position, as shown in FIG. 7. According to FIG. 8, the pallet receptacle 2 is then ready to be filled again with a new pallet stack.

In particular FIG. 3 shows that the described process not only provides for an energy-saving loading but also provides advantages in regard to the alignment of the individual pallets relative to one another. Since all of the pallets of the pallet stack 18 rests with one of their narrow sides on the slanted first leg 3, the pallets are exactly aligned relative to this plane. This alignment facilitates the further transport of the pallet stack.

The device can be used not only for stacking but also for removing pallets from a delivered pallet stack. The delivery of the pallet stack is performed according to FIG. 6 in reverse order; subsequently, the device is pivoted into the position to according to FIGS. 1 to 3 in which the individual pallets can be removed in an energy-saving way.

Locking of the pallet receptacle in its two end positions is carried out preferably automatically. If needed, it is also possible to install a switch which will send a message to an operating device when a pallet stack is completed. As soon as the downstream pallet transport device has removed the pallet stack, the pallet receptacle 2 can be pivoted back into its initial position and is then automatically locked again in this position.

While specific embodiments of the invention have been shown and described in detail to illustrate the inventive principles, it will be understood that the invention may be embodied otherwise without departing from such principles.

What is claimed is:

1. A device for stacking empty transport pallets and removing empty transport pallets from a stack, the device comprising:
    a pallet receptacle (2), comprising a first leg (3), a second leg (4) positioned at a right angle to the first leg (3), and a connecting element rigidly connecting the first and second legs, the pallet receptacle configured to receive a pallet stack (18) of pallets (11, 15, 16), wherein the pallets (11, 15, 16) are supported with a narrow side on the first leg (3) while the lowermost pallet (16) of the pallet stack (18) rests flat on the second leg (4);
    a frame (1) in which the pallet receptacle (2) is pivotably suspended on an axle (7) for pivoting the pallet receptacle (2) between a first end position, in which the first leg (3) extends at a slant to the horizontal, and a second end position, in which the first leg (3) extends substantially vertically;
    wherein the axle (7) extends parallel to a connecting line where the first leg (3) and the second leg (4) are connected to one another;
    wherein the axle (7) is connected to the connecting element and is arranged on a centroidal axis of the pallet receptacle (2) filled with a complete pallet stack (18).

2. The device according to claim 1, wherein the pallet contact surface of the second leg (4) has at least one recess extending from a free edge of the second leg (4) in a direction toward the first leg (3), wherein the recess is configured to receive a loading fork of a pallet transport device.

3. The device according to claim 1, wherein the second leg (4) has a bottom side (8) and a support leg (9) connected to the bottom side (8).

* * * * *